United States Patent
Minarcin et al.

(10) Patent No.: US 9,527,484 B2
(45) Date of Patent: Dec. 27, 2016

(54) REGENERATIVE BRAKING CONTROL USING A DYNAMIC MAXIMUM REGENERATIVE BRAKING TORQUE CALCULATION

(75) Inventors: Monika A. Minarcin, Northville, MI (US); Jon K. Logan, Howell, MI (US); Eric M. Rask, Chicago, IL (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 1509 days.

(21) Appl. No.: 12/756,431

(22) Filed: Apr. 8, 2010

(65) Prior Publication Data
US 2011/0251770 A1    Oct. 13, 2011

(51) Int. Cl.
| | |
|---|---|
| *B60T 7/04* | (2006.01) |
| *B60T 1/10* | (2006.01) |
| *B60W 10/08* | (2006.01) |
| *B60W 10/188* | (2012.01) |
| *B60W 30/18* | (2012.01) |

(52) U.S. Cl.
CPC ............... *B60T 7/042* (2013.01); *B60T 1/10* (2013.01); *B60W 10/08* (2013.01); *B60W 10/188* (2013.01); *B60W 30/18127* (2013.01); *B60T 2210/36* (2013.01); *B60T 2270/604* (2013.01); *B60W 2510/1005* (2013.01); *B60W 2520/28* (2013.01); *B60W 2530/10* (2013.01); *B60W 2540/12* (2013.01)

(58) Field of Classification Search
USPC ............................................. 701/71; 303/155
See application file for complete search history.

(56) References Cited

U.S. PATENT DOCUMENTS 6,457,784 B1 * 10/2002 Bohm et al. .................. 303/155

FOREIGN PATENT DOCUMENTS

| DE | 19810656 A1 | 9/1999 |
|---|---|---|
| EP | 0361708 B1 | 2/1994 |

* cited by examiner

*Primary Examiner* — John Pauls
(74) *Attorney, Agent, or Firm* — Lorenz & Kopf (57) ABSTRACT

Methods and systems for controlling regenerative braking in a vehicle having a regenerative braking system are provided. Values of one or more dynamic variables are obtained during operation of the vehicle. A maximum regenerative braking torque is calculated using the dynamic variable values. Regenerative braking torque is provided up to the maximum regenerative braking torque.

20 Claims, 2 Drawing Sheets

REGENERATIVE BRAKING CONTROL USING A DYNAMIC MAXIMUM REGENERATIVE BRAKING TORQUE CALCULATION

TECHNICAL FIELD

The disclosed subject matter generally relates to the field of vehicles and, more specifically, to methods and systems for controlling regenerative braking in vehicles using a dynamic capacity calculation.

BACKGROUND

Automobiles and various other vehicles include braking systems for reducing vehicle speed or bringing the vehicle to a stop. Such braking systems generally include a controller that regulates the delivery of braking pressure to braking calipers on one or both axles of the vehicle to produce braking torque for the vehicle. For example, in a regenerative braking system, hydraulic or other braking pressure is generally provided for both a non-regenerative braking axle and a regenerative braking axle. Many hybrid electric vehicles provide regenerative braking up to a fixed value that is deemed to be a maximum regenerative braking torque for the vehicle. However, the true maximum regenerative braking torque for the vehicle may vary at different times and/or under different conditions.

Accordingly, it is desirable to provide an improved method for controlling regenerative braking for a vehicle using a dynamic maximum regenerative braking torque calculation. It is also desirable to provide an improved system for controlling regenerative braking for a vehicle using a dynamic maximum regenerative braking torque calculation.

SUMMARY

In accordance with an exemplary embodiment, a method for controlling regenerative braking in a vehicle having a regenerative braking system is provided. The method comprises the steps of calculating a maximum regenerative braking torque using a dynamic variable during operation of the vehicle, and providing regenerative braking torque up to the maximum regenerative braking torque via the regenerative braking system.

In accordance with another exemplary embodiment, a system for controlling regenerative braking in a vehicle having a regenerative braking system is provided. The system comprises a memory and a processor. The memory is configured to store a dynamic variable value during operation of the vehicle. The processor is coupled to the memory, and is configured to calculate a maximum regenerative braking torque using the dynamic variable value, and to provide instructions to the regenerative braking system to provide regenerative braking torque up to the maximum regenerative braking torque.

In accordance with a further exemplary embodiment, a system for controlling regenerative braking in a vehicle having regenerative braking units and an energy storage system is provided. The system comprises a sensor and a controller. The sensor is configured to measure a dynamic variable value during operation of the vehicle. The controller is coupled to the sensor, and is configured to calculate a maximum regenerative braking torque using the dynamic variable value and provide instructions to the regenerative braking units to provide regenerative braking torque up to the maximum regenerative braking torque. The maximum regenerative braking torque corresponds to a maximum regenerative energy capture for the energy storage system.

Furthermore, other desirable features and characteristics of the method and systems will be apparent from the subsequent detailed description and the appended claims, taken in conjunction with the accompanying drawings and the foregoing technical field and background.

BRIEF DESCRIPTION OF THE DRAWINGS

Certain embodiments of the present invention will hereinafter be described in conjunction with the following drawing figures, wherein like numerals denote like elements, and wherein.

DETAILED DESCRIPTION

The following detailed description is merely exemplary in nature, and is not intended to limit the application and uses thereof. Furthermore, here is no intention to be bound by the preceding background of the invention or the following detailed description.

Figure 1:
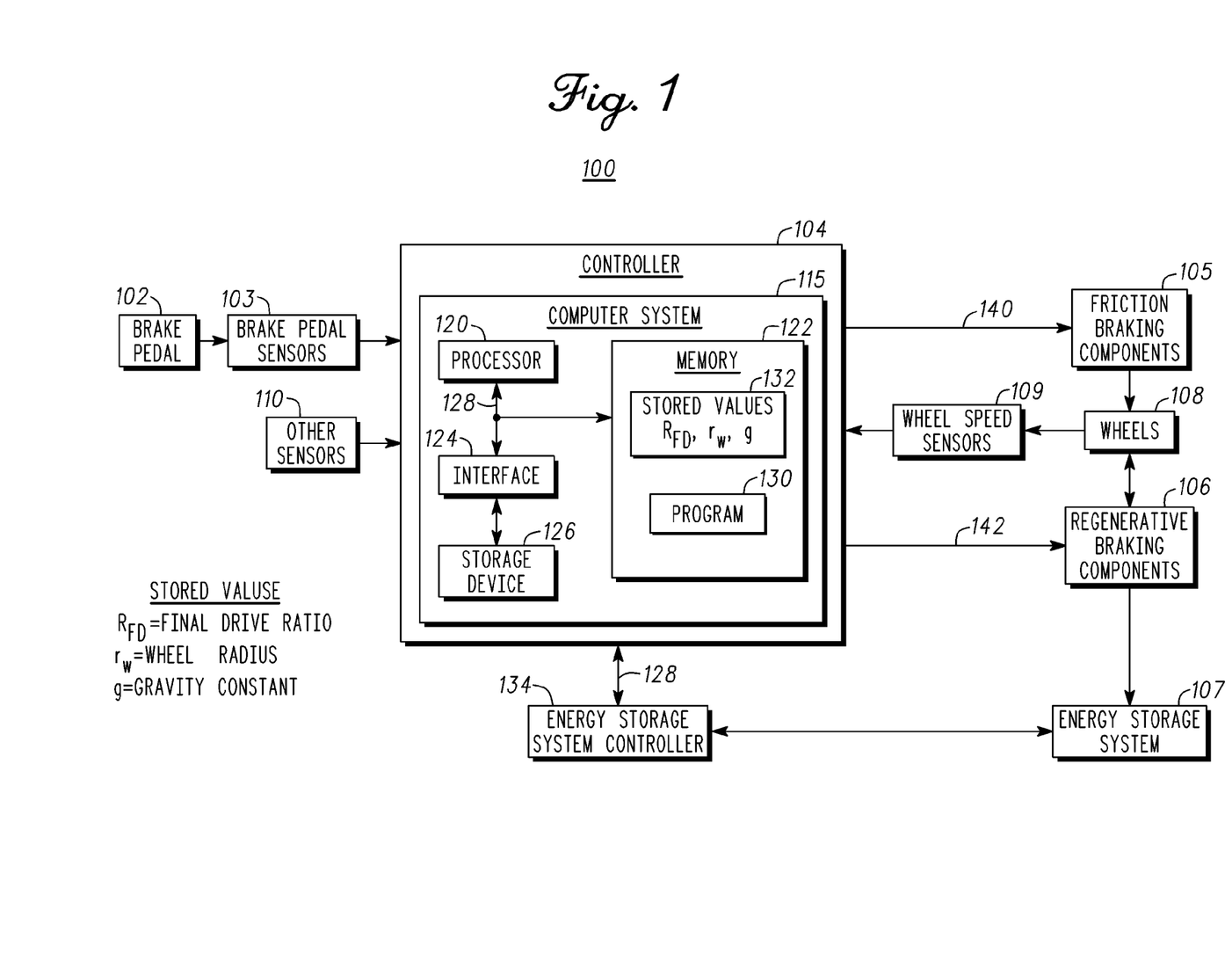
FIG. 1 is a functional block diagram of a braking system for a vehicle, such as a hybrid electric vehicle, fuel cell, or electric vehicle applications, in accordance with an exemplary embodiment.

FIG. 1 is a block diagram of an exemplary braking system 100 for use in a brake-by-wire system of a vehicle, such as an automobile. In a preferred embodiment, the vehicle is an automobile, such as a sedan, a sport utility vehicle, a van, or a truck. Also in a preferred embodiment, the vehicle is a hybrid electric vehicle. However, the type of vehicle may vary in different embodiments.

As depicted in FIG. 1, the braking system 100 includes a brake pedal 102, one or more brake pedal sensors 103, a controller 104, friction braking components 105, regenerative braking components 106, an energy storage system 107, and one or more wheel speed sensors 109. In certain embodiments, the braking system 100 may include and/or be coupled to one or more other sensors, devices, and/or other modules 110, such as, by way of example only, a vehicle mass sensor and/or a global positioning system (GPS) device.

The friction braking components 105 and the regenerative braking components 106 preferably comprise friction braking units 105 and regenerative braking units 106, respectively. In a preferred embodiment, the friction braking units 105 are disposed along a first axle 140 of the vehicle along with certain of the wheels 108, and the regenerative braking units 106 are disposed along a second axle 142 of the vehicle along with certain other of the wheels 108. In one embodiment, the first axle 140 is a non-regenerative braking axle coupled to the friction braking components 105, and the second axle 142 is a regenerative braking axle 142 coupled to the regenerative braking components 106. In certain other embodiments, the first axle 140 and the second axle 142 are both regenerative braking axles coupled to the regenerative braking components 106, and regenerative braking is provided to each of the wheels 108.

The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system. In another preferred embodiment, the braking system 100 is a hydraulic system.

The wheel speed sensors 109 are coupled to one or more of the wheels 108, and measure one or more speeds and movements thereof during operation of the vehicle. These measurements and/or information related thereto are provided to the controller 104 for processing and for calculation of a maximum regenerative braking torque for the vehicle, preferably corresponding to a maximum capacity of the energy storage system 107 as determined by the energy system controller 134 for regenerative energy capture, and ultimately for use in controlling braking for the regenerative braking components 106 and the friction braking components 105 of the vehicle.

The brake pedal sensors 103 are coupled between the brake pedal 102 and the controller 104. Specifically, in accordance with various preferred embodiments, the brake pedal sensors 103 preferably include one or more brake pedal force sensors and/or one or more brake pedal travel sensors. The number of brake pedal sensors 103 may vary. For example, in certain embodiments, the braking system 100 may include a single brake pedal sensor 103. In various other embodiments, the braking system 100 may include any number of brake pedal sensors 103.

The brake pedal travel sensors, if any, of the brake pedal sensors 103 provide an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved.

The brake pedal force sensors, if any, of the brake pedal sensors 103 determine how much force the operator of braking system 100 is applying to the brake pedal 102, which is also known as brake pedal force. In one exemplary embodiment, such a brake pedal force sensor, if any, may include a hydraulic pressure emulator and/or a pressure transducer, and the brake pedal force can be determined by measuring hydraulic pressure in a master cylinder of the braking system 100.

Regardless of the particular types of brake pedal sensors 103, the brake pedal sensors 103 detect one or more values (such as brake pedal travel and/or brake pedal force) pertaining to the drivers' engagement of the brake pedal 102. The brake pedal sensors 103 also provide signals or information pertaining to the detected values pertaining to the driver's engagement of the brake pedal 102 to the computer system 115 for processing by the computer system 115 in determining the driver intended braking torque for the vehicle.

The controller 104 is coupled between the various sensors, the energy storage system 107, the friction and regenerative braking components 105, 106 and the first and second axles 140, 142. Specifically, the controller 104 monitors the driver's engagement of the brake pedal 102 and the measurements from the sensors (and, in some cases, information provided by the other modules 110), provides various calculations and determinations pertaining thereto, including calculating a maximum regenerative braking torque for regenerative energy capture, and controls regenerative braking and friction braking of the vehicle via braking instructions or commands sent to the regenerative braking units 106 and the friction braking components 105 by the controller 104 along the second axle 142 and the first axle 140, respectively.

In certain embodiments, different controllers (each preferably comprising different respective computer systems and/or processors) may be utilized in conjunction with the braking system 100. For example, in one exemplary embodiment depicted in FIG. 1, the energy storage system 107 has a separate energy storage system controller 134 coupled between the controller 104 and the energy storage system 107. Accordingly, in the depicted embodiment, the controller 104 is directly coupled to the energy storage system controller 134, and is thereby indirectly coupled to the energy storage system 107. The storage system controller 134 establishes the limits for the energy storage system 107, such as for state of charge, state of energy, power limits, current limits, and voltage limits. In certain embodiments other limits may also be imposed. For example, in a FWD (front wheel drive) or RWD (rear wheel drive) 2 Mode Hybrid configuration, there may also be an intermediary controller (such as a hybrid control processor) coupled to the storage system controller 134 that may further reduce the capability of the energy storage system 107 to effective accept electrical charge.

In the depicted embodiment, the controller 104 comprises a computer system 115. In certain embodiments, the controller 104 may also include one or more of the sensors, among other possible variations. In addition, it will be appreciated that the controller 104 may otherwise differ from the embodiment depicted in FIG. 1, for example in that the controller 104 may be coupled to or may otherwise utilize one or more remote computer systems and/or other control systems.

In the depicted embodiment, the computer system 115 is coupled between the brake pedal sensors 103, the friction and regenerative braking components 105, 106, and the first and second axles 140, 142. The computer system 115 receives the signals or information from the various sensors, and further processes these signals or information in order to control braking of the vehicle and apply appropriate amounts of braking torque or pressure to the friction braking components 105 and the regenerative braking components 106 along the first axle 140 and the second axle 142, respectively, via braking commands sent to the friction braking components 105 and the regenerative braking components 106 by the computer system 115 based on the driver intended braking torque, and a maximum regenerative braking torque. In a preferred embodiment, these and other steps are conducted in accordance with the process 200 depicted in FIG. 2 and described further below in connection therewith.

In the depicted embodiment, the computer system 115 includes a processor 120, a memory 122, an interface 124, a storage device 126, and a bus 128. The processor 120 performs the computation and control functions of the computer system 115 and the controller 104, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 130 contained within the memory 122 and, as such, controls the general operation of the controller 104 and the computer system 115, preferably in executing the steps of the processes described herein, such as the process 200 depicted in FIG. 2 and described further below in connection therewith.

The memory 122 can be any type of suitable memory. This would include the various types of dynamic random access memory (DRAM) such as SDRAM, the various types of static RAM (SRAM), and the various types of non-volatile memory (PROM, EPROM, and flash). The bus 128 serves to transmit programs, data, status and other information or signals between the various components of the computer system 115. In a preferred embodiment, the memory 122 stores the above-referenced program 130 along with one or more stored values 132 that are used in controlling the regenerative braking of the regenerative braking components 106 and the friction braking of the friction braking components 105 in accordance with steps of the process 200 depicted in FIG. 2 and described further below in connection therewith.

The interface 124 allows communication to the computer system 115, for example from a system driver and/or another computer system, and can be implemented using any suitable method and apparatus. It can include one or more network interfaces to communicate with other systems or components. The interface 124 may also include one or more network interfaces to communicate with technicians, and/or one or more storage interfaces to connect to storage apparatuses, such as the storage device 126.

The storage device 126 can be any suitable type of storage apparatus, including direct access storage devices such as hard disk drives, flash systems, floppy disk drives and optical disk drives. In one exemplary embodiment, the storage device 126 comprises a program product from which memory 122 can receive a program 130 that executes one or more of the processes described herein, such as the process 200 of FIG. 2 or portions thereof. In another exemplary embodiment, the program product may be directly stored in and/or otherwise accessed by the memory 122 and/or a disk, such as that referenced below.

The bus 128 can be any suitable physical or logical means of connecting computer systems and components. This includes, but is not limited to, direct hard-wired connections, fiber optics, infrared and wireless bus technologies. During operation, the program 130 is stored in the memory 122 and executed by the processor 120. In certain embodiments, a bus 128 (which may be the same bus or a different bus as the bus 128 of the computer system 115) is also similarly coupled between the controller 104 and the energy storage system controller 134.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 115 may also otherwise differ from the embodiment depicted in FIG. 1, for example in that the computer system 115 may be coupled to or may otherwise utilize one or more remote computer systems and/or other control systems.

The friction braking units 105 are coupled between the controller 104 and the wheels 108. In the depicted embodiment, the friction braking units 105 are disposed along the first axle 140 and are coupled to certain wheels 108 on the first axle 140. The friction braking units 105 receive friction braking commands from the controller 104, and are controlled thereby accordingly. The friction braking units 105 can include any number of different types of devices that, upon receipt of braking commands, can apply the proper braking torque as received from the controller 104. For example, in an electro-hydraulic system, the friction braking units 105 can comprise an actuator that can generate hydraulic pressure that can cause brake calipers to be applied to a brake disk to induce friction to stop a vehicle. Alternatively, in an electro-mechanical brake-by-wire system, the friction braking units 105 can comprise a wheel torque-generating device that operates as a vehicle brake.

The regenerative braking units 106 are also coupled between the controller 104 and the wheels 108. In the depicted embodiment, the regenerative braking units 106 are disposed along the second axle 142 and are coupled to certain wheels 108 on the second axle 142. The regenerative braking units 106 receive regenerative braking commands from the controller 104, and are controlled thereby accordingly. The regenerative braking units can include any number of different types of devices that, upon receipt of braking commands, can apply the proper braking torque as received from the controller 104. For example, in an electro-hydraulic system, the regenerative braking units 106 can comprise an actuator that can generate hydraulic pressure that can cause brake calipers to be applied to a brake disk to induce friction to stop a vehicle. Alternatively, in an electro-mechanical brake-by-wire system, the regenerative braking units 106 can comprise a wheel torque-generating device that operates as a vehicle brake.

The regenerative braking units 106, when applied, at least facilitate conversion of kinetic energy into electrical energy. The energy storage system 107 (for example, a battery) captures regenerative energy during braking of the regenerative braking components 106 as kinetic energy is transformed into electrical energy. In a preferred embodiment, the energy storage system 107 comprises a hybrid fraction energy storage system for the regenerative braking components 106, and the regenerative power or energy that is captured is used for traction power for the regenerative braking components 106.

The controller 104 may also be coupled to one or more other sensors, devices, and/or other modules 110 of FIG. 1. As referenced above, the sensors, devices, and/or other modules 110 may include one or more vehicle mass sensors and/or global positioning system (GPS) devices. The vehicle mass sensors, if any, measure a mass of the vehicle during operation thereof. The vehicle mass may vary for a particular vehicle at different times, for example depending on the number of passengers in the vehicle, the weight of the passengers, the weight of luggage or other materials in the vehicle, and the like. In one embodiment, the vehicle mass sensors are disposed on one or both of the first and second axles 140 and 142. However, the vehicle mass sensors may be disposed on, under, or within other portions of the vehicle. These measurements and/or information related thereto are provided to the controller 104 for processing and for calculation of the maximum regenerative braking torque for use in controlling braking for the regenerative braking components 106 and the friction braking components 105 of the vehicle.

The GPS devices, if any, determine positions and movements of the vehicle, for example for use in determining a vehicle speed. In one embodiment, the GPS device is disposed within a separate module of the vehicle. These measurements and/or information related thereto are provided to the controller 104 for processing and for calculation of the maximum regenerative braking torque regenerative energy capture for use in controlling braking for the regenerative braking components 106 and the friction braking components 105 of the vehicle.

Figure 2:
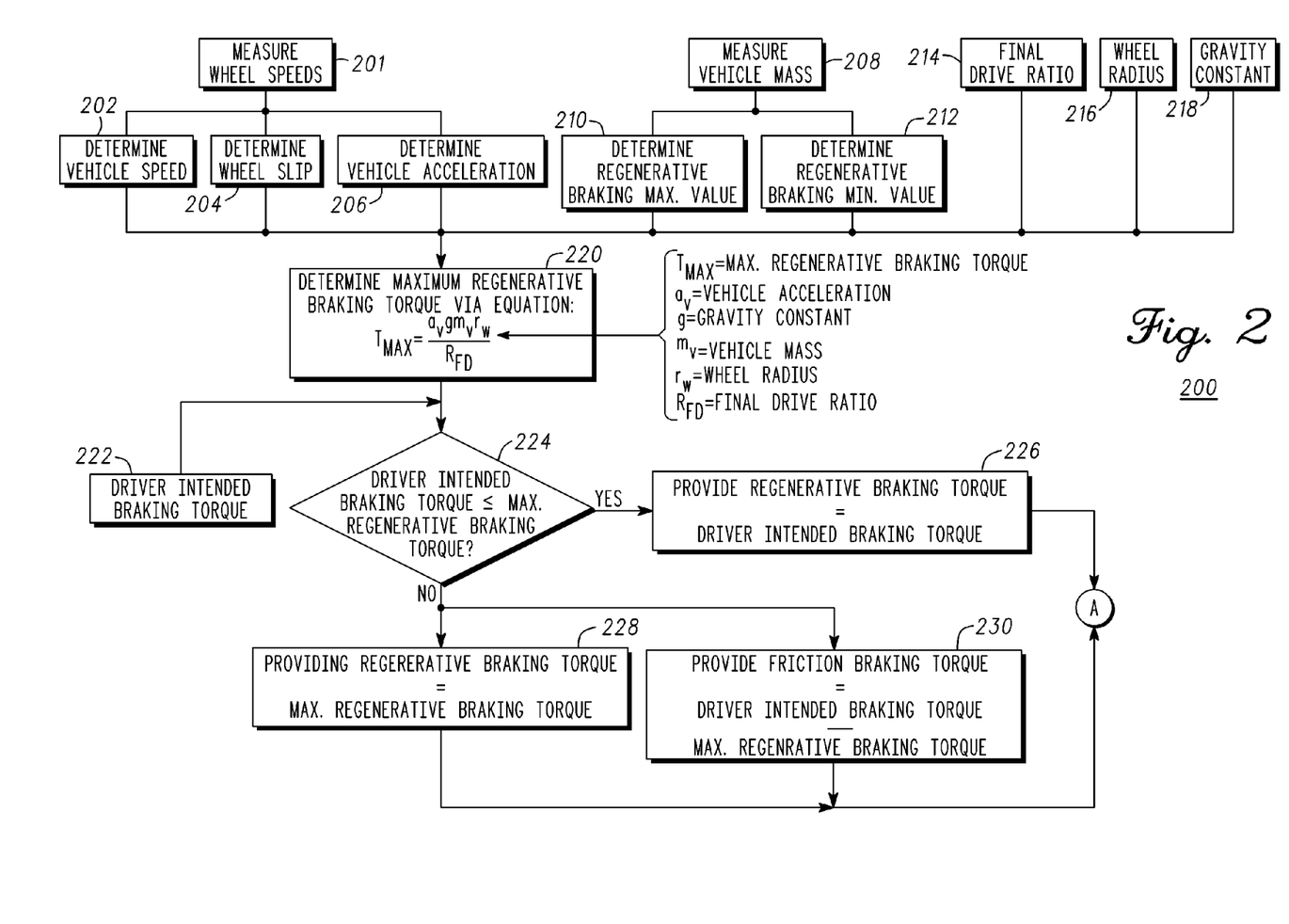
FIG. 2 is a flowchart of a process for controlling regenerative braking using a dynamic maximum regenerative braking torque calculation for regenerative energy capture for an energy storage system of the vehicle, such as a hybrid electric vehicle, and that can be utilized in connection with the braking system of FIG. 1, in accordance with an exemplary embodiment.

FIG. 2 is a flowchart of a process 200 for controlling regenerative braking in a vehicle, in accordance with an exemplary embodiment. The process 200 calculates a maximum regenerative energy capture capacity of an energy storage system of the vehicle for use in optimally controlling the regenerative braking and the friction braking for the vehicle. The process 200 can be implemented in connection with the braking system 100 of FIG. 1, the controller 104, and/or the computer system 115 of FIG. 1, also in accordance with an exemplary embodiment.

As depicted in FIG. 2, the process 200 begins with the step of measuring one or more wheel speeds of the vehicle (step 201). The number of wheel speed values, and the methods of determining the wheel speed values, may vary in different embodiments. Preferably the wheel speed values are determined for each wheel 108 of FIG. 1 by the wheel speed sensors 109 of FIG. 1 and stored in the memory 122 of FIG. 1 as stored values 132 of FIG. 1 and/or provided directly to the processor 120 of FIG. 1 for processing, most preferably continuously during operation of the vehicle. During each iteration of the process 200, the processor 120 of FIG. 1 preferably processes instantaneous values of these variables for use in the calculations and determinations performed by the processor 120 of FIG. 1 and for ultimate use in controlling braking for the vehicle.

In addition, a vehicle speed is determined during operation of the vehicle (step 202). In a preferred embodiment, the vehicle speed is calculated by the processor 120 of FIG. 1 based on the wheel speed values of step 201 continuously during operation of the vehicle, and may also be stored in the memory 122 of FIG. 1 as one of the stored values 132 of FIG. 1 for subsequent use by the processor 120 of FIG. 1. In certain other embodiments, the vehicle speed may be calculated using one or more other values from one or more other sensors, devices, and/or other modules 110 of FIG. 1, such as, by way of example only, a global positioning system (GPS) device. During each iteration of the process 200, the processor 120 of FIG. 1 preferably processes the current or instantaneous values of these variables for use in the calculations and determinations performed by the processor 120 of FIG. 1 and for ultimate use in controlling braking for the vehicle.

One or more wheel slip values are also determined during operation of the vehicle (step 204). The number of wheel slip values, and the methods of determining the wheel slip values may vary in different embodiments. Preferably the wheel slip values are calculated for each wheel 108 of FIG. 1 by the processor 120 of FIG. 1 based on the wheel speed values of step 201 continuously during operation of the vehicle. These values may also be stored in the memory 122 of FIG. 1 as stored values 132 of FIG. 1 for subsequent use by the processor 120 of FIG. 1. During each iteration of the process 200, the processor 120 of FIG. 1 preferably processes the current or instantaneous values of these variables for use in the calculations and determinations performed by the processor 120 of FIG. 1 and for ultimate use in controlling braking for the vehicle.

One or more vehicle acceleration values are also determined during operation of the vehicle (step 206). Preferably the vehicle acceleration values are calculated by the processor 120 of FIG. 1 based on the wheel speed values of step 201 continuously during operation of the vehicle. These values may also be stored in the memory 122 of FIG. 1 as stored values 132 of FIG. 1 for subsequent use by the processor 120 of FIG. 1. During each iteration of the process 200, the processor 120 of FIG. 1 preferably processes the current or instantaneous values of these variables for use in the calculations and determinations performed by the processor 120 of FIG. 1 and for ultimate use in controlling braking for the vehicle.

A vehicle mass is also measured during operation of the vehicle (step 208). In a preferred embodiment, the vehicle mass is measured by a vehicle mass sensor and stored in the memory 122 of FIG. 1 as a stored value 132 of FIG. 1 and/or provided directly to the processor 120 of FIG. 1 for processing. The vehicle mass may vary for a particular vehicle at any particular time, for example depending on the number of passengers in the vehicle, the weight of the passengers, the weight of luggage or other materials in the vehicle, and the like. During each iteration of the process 200, the processor 120 of FIG. 1 preferably processes the current or instantaneous values of these variables for use in the calculations and determinations performed by the processor 120 of FIG. 1 and for ultimate use in controlling braking for the vehicle.

A regenerative braking regenerative braking minimum value is also determined (step 210). The regenerative braking minimum value is preferably determined using the vehicle mass that was measured in step 208. The regenerative braking minimum value preferably represents a minimum regenerative braking value that is acceptable for a particular vehicle based on the vehicle mass, for example as determined using vehicle manufacture specifications, look-up tables, and/or other information stored in the memory 122 of FIG. 1. During each iteration of the process 200, the processor 120 of FIG. 1 preferably processes the current or instantaneous values of these variables for use in the calculations and determinations performed by the processor 120 of FIG. 1 and for ultimate use in controlling braking for the vehicle.

Various values are then retrieved from memory (steps 214-218). In a preferred embodiment, the processor 120 of FIG. 1 retrieves values of a final driver ratio (step 214), a wheel radius (step 216), and a gravity constant (step 218) for the vehicle from the memory 122 of FIG. 1. Each of the values may correspond to the stored values 132 of FIG. 1.

A maximum regenerative braking torque is then determined (step 220). The maximum regenerative braking torque preferably corresponds to a dynamic value corresponding to a maximum regenerative energy capture for the energy storage system at any particular point in time, as calculated using dynamic variable inputs. Specifically, the maximum regenerative braking torque is preferably an amount of regenerative braking torque that would produce the maximum regenerative energy capture corresponding to the maximum regenerative braking torque at a particular point in time during operation of the vehicle. Also in a preferred embodiment, the maximum regenerative braking torque is calculated by the processor 120 of FIG. 1. In certain embodiments, the maximum capacity corresponds to a maximum energy capture for the energy storage system 107 and a maximum energy capture system limit (namely, a maximum rate of energy capture) for the braking system 100. The maximum energy capture system limit may also be influenced by other values, such as a state of any other component in the braking system 100, including, for example, a motor or generator temperature, an inverter temperature (for a direct current (DC) to DC inverter, an alternating current (AC) to DC inverter, or an AC to AC inverter), an energy storage system voltage, an energy storage system, an energy storage system power or energy limit, a gear or mode state, or an engine torque.

In a preferred embodiment, during step 222, the processor 120 of FIG. 1 calculates the maximum regenerative braking torque using the wheels speed values of step 202, the wheel slip values of step 204, the vehicle acceleration values of step 206, the regenerative braking maximum value of step 210, the regenerative braking minimum value of step 212, the final driver ratio of step 214, the wheel radius of step 216, and the gravity constant of step 218. Specifically, in a preferred embodiment, the processor 120 of FIG. 1 calculates the maximum regenerative braking torque in step 220 using the following equation:

$$T_{max} = a_v * g * m_v * r_w / R_{FD} \qquad \text{(Equation 1)},$$

in which $T_{max}$ represents the maximum regenerative braking torque, $a_v$ represents the vehicle acceleration, g represents the gravity constant, $m_v$ represents the vehicle mass, $r_w$ represents the wheel radius, and $R_{FD}$ represents the final drive ratio.

In addition, a driver intended braking torque is determined (step 222). In a preferred embodiment, the driver intended braking torque is determined by the processor 120 of FIG. 1 using braking inputs or requests pertaining to engagement of the brake pedal 102 by a driver of the vehicle as determined by the brake pedal sensors 103 of FIG. 1. Specifically, the braking requests preferably pertain to values of brake pedal travel and/or brake pedal force as obtained by the brake pedal sensors 103 of FIG. 1 and provided to the computer system 115 of FIG. 1, where these values may be stored in the memory 122 of FIG. 1 as stored values 132 of FIG. 1 and provided to the processor 120 of FIG. 1 for processing for use in determining the driver intended braking torque along with one or more equations and/or look-up tables stored in the memory 122 of FIG. 1 (for example, as some of the stored values 132 of FIG. 1) in determining the driver intended braking torque during step 212. The braking requests are preferably received and obtained and the driver intended braking torque is preferably determined continuously at different points or periods in time throughout a braking event for the vehicle. During each iteration of the process 200, the processor 120 of FIG. 1 preferably processes the current or instantaneous values of these variables for use in the calculations and determinations performed by the processor 120 of FIG. 1 and for ultimate use in controlling braking for the vehicle.

A determination is then made as to whether the driver intended braking torque of step 222 is less than or equal to the maximum regenerative braking torque of step 220 (step 224). In a preferred embodiment, this determination is made by the processor 120 of FIG. 1.

If a determination is made in step 224 that the driver intended braking torque is less than or equal to the maximum regenerative braking torque, then regenerative braking torque is provided equal to the driver intended braking torque of step 222 (step 226). Preferably, during step 226, the processor 120 of the controller 104 of FIG. 1 provides instructions or commands to the regenerative braking components 106 of FIG. 1 along the second axle 142 of FIG. 1 to provide regenerative braking torque equal to the driver intended braking torque, and the regenerative braking units 106 implement these instructions or commands. Following step 226, the process preferably returns to step 201, and the process continuously repeats with new iterations using new or updated dynamic variable values and calculations throughout the operation of the vehicle.

Conversely, if a determination is made in step 224 that the driver intended braking torque is greater than the maximum regenerative braking torque, then regenerative braking torque is provided equal to the maximum regenerative braking torque of step 220 (step 228). Preferably, during step 228, the processor 120 of the controller 104 of FIG. 1 provides instructions or commands to the regenerative braking units 106 of FIG. 1 along the second axle 142 of FIG. 1 to provide regenerative braking torque equal to the maximum regenerative braking torque, and the regenerative braking units 106 of FIG. 1 implement these instructions or commands.

In addition, if a determination is made in step 224 that the driver intended braking torque is greater than the maximum regenerative braking torque, then friction braking torque is also provided (step 230). During step 230, friction braking torque is provided equal to a difference between the driver intended braking torque of step 222 and the maximum regenerative braking torque of step 220, in accordance with the following equation:

Friction Braking Torque=Driver Intended Braking Torque−Maximum Regenerative Braking Torque (Equation 2)

Preferably, during step 230, the processor 120 of the controller 104 of FIG. 1 provides instructions or commands to the friction braking units 105 of FIG. 1 along the first axle 140 of FIG. 1 to provide friction braking torque in accordance with Equation 2, and the friction braking units 105 of FIG. 1 implement these instructions or commands.

Preferably steps 228 and 230 occur simultaneously. The total braking torque provided by the regenerative braking components 106 of FIG. 1 and the friction braking components 105 of FIG. 1 during steps 228 and 230 is preferably equal to the total braking torque intended by the driver as determined in step 212. Following steps 228 and 230 220, the process preferably returns to step 201, and the process continuously repeats with new iterations using new or updated dynamic variable values and calculations throughout the operation of the vehicle.

Accordingly, improved methods and systems are provided for controlling regenerative braking of vehicles, such as hybrid electric automobiles. The improved methods and systems provide regenerative braking torque corresponding to a dynamic capacity, or dynamic maximum regenerative energy capture, for the energy storage system as calculated using dynamic variable values during operation of the vehicle. By calculating and using dynamic rather than static values of the maximum regenerative braking torque, the methods and systems provide for potentially more efficient usage of regenerative braking systems, and result in correspondingly greater amounts of energy capture. In addition, the methods and systems also may provide additional potential benefits, such as by helping to prevent possible vehicle sail-on conditions and by also helping to facilitate regenerative braking even at very low speeds, for example because regenerative energy capture is attained up to a true, dynamic maximum value for the energy storage system taking into account dynamic variable values such as wheel slip, vehicle speed, and vehicle mass during operation of the vehicle.

It will be appreciated that the disclosed methods and systems may vary from those depicted in the Figures and described herein. For example, as mentioned above, the controller 104 of FIG. 1 may be disposed in whole or in part in any one or more of a number of different vehicle units, devices, and/or systems. In addition, it will be appreciated that certain steps of the process 200 may vary from those depicted in FIG. 2 and/or described herein in connection therewith. It will similarly be appreciated that certain steps of the process 200 may occur simultaneously or in a different order than that depicted in FIG. 2 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

We claim:

1. A method for controlling regenerative braking in a vehicle having a regenerative braking system and a friction braking system, the method comprising the steps of:
   calculating a maximum regenerative braking torque for the regenerative braking system during operation of the vehicle using a plurality of dynamic vehicle parameters comprising an acceleration of the vehicle, a mass of the vehicle, a wheel radius of the vehicle, and a drive ratio of the vehicle, wherein the maximum regenerative braking torque comprises an amount of regenerative braking torque that would produce the maximum regenerative energy capture corresponding to the maximum regenerative braking torque at a particular point in time during operation of the vehicle;
   obtaining an input from a driver of the vehicle during operation of the vehicle;
   determining a driver intended braking torque for the vehicle based on the input from the driver;
   if the driver intended braking torque for the vehicle is less than the maximum regenerative braking torque for the regenerative braking system, then providing regenerative braking torque for the vehicle via the regenerative braking system in an amount that is equal to the driver intended braking torque for the vehicle; and
   if the driver intended amount of braking torque for the vehicle is equal to the maximum regenerative braking torque for the regenerative braking system, then:
      providing regenerative braking torque for the vehicle via the regenerative braking system in an amount that is equal to the maximum regenerative braking torque for the regenerative braking system; and
      providing friction braking torque for the vehicle via the friction braking system in an amount that is equal to a difference between the driver intended braking torque for the vehicle and the maximum regenerative braking torque for the regenerative braking system.

2. The method of claim 1, wherein the vehicle includes a wheel, and the method further comprises the step of:
   determining a wheel slip of the wheel during operation of the vehicle;
   wherein the step of calculating the maximum regenerative braking torque for the regenerative braking system comprises the step of calculating the maximum regenerative braking torque for the regenerative braking system using the wheel slip.

3. The method of claim 2, further comprising the steps of:
   determining a speed of the vehicle during operation of the vehicle; and
   determining the mass of the vehicle during operation of the vehicle;
   wherein the step of calculating the maximum regenerative braking torque for the regenerative braking system comprises the step of calculating the maximum regenerative braking torque for the regenerative braking system using the wheel slip, the speed, and the mass.

4. The method of claim 1, further comprising the step of:
   determining a speed of the vehicle during operation of the vehicle;
   wherein the step of calculating the maximum regenerative braking torque for the regenerative braking system comprises the step of calculating the maximum regenerative braking torque for the regenerative braking system using the speed.

5. The method of claim 1, further comprising the step of:
   determining the mass of the vehicle during operation of the vehicle;
   wherein the step of calculating the maximum regenerative braking torque for the regenerative braking system comprises the step of calculating the maximum regenerative braking torque for the regenerative braking system using the mass.

6. The method of claim 1, wherein:
   the vehicle includes an energy storage system; and
   the maximum regenerative braking torque for the regenerative braking system corresponds to a maximum regenerative energy capture for the energy storage system.

7. The method of claim 1, wherein the maximum regenerative braking torque is determined using a maximum rate of energy capture for the regenerative braking system.

8. The method of claim 7, wherein the maximum regenerative braking torque is determined using a wheel slip value and the acceleration of the vehicle in addition to a regenerative braking minimum value, wherein the regenerative braking minimum value represents a minimum regenerative braking value that is acceptable for a particular vehicle based on the vehicle mass, as determined using one or more vehicle manufacture specifications, look-up tables, or information stored in a memory of the vehicle.

9. The method of claim 1, wherein the step of calculating the maximum regenerative braking torque comprises calculating the maximum regenerative braking torque for the regenerative braking system during operation of the vehicle based on each of the following vehicle parameters: the acceleration of the vehicle, the mass of the vehicle, the wheel radius of the vehicle, and the drive ratio of the vehicle.

10. The method of claim 9, wherein the drive ratio comprises a final drive ratio for the vehicle.

11. The method of claim 10, wherein the step of calculating the maximum regenerative braking torque comprises calculating the maximum regenerative braking torque for the regenerative braking system during operation of the vehicle based on the following equation:

$$T_{max} = a_v * m_v * r_w / R_{FD},$$

in which $T_{max}$ represents the maximum regenerative braking torque, $a_v$ represents the acceleration of the vehicle, g represents a gravity constant, $m_v$ represents the mass of the vehicle, $r_w$ represents the wheel radius of the vehicle, and $R_{FD}$ represents the final drive ratio of the vehicle.

12. A system for controlling regenerative braking in a vehicle having a regenerative braking system and a friction braking system, the system comprising:
   a memory configured to store a plurality of dynamic vehicle parameters during operation of the vehicle, the plurality of dynamic vehicle parameters comprising an acceleration of the vehicle, a mass of the vehicle, a wheel radius of the vehicle, and a drive ratio of the vehicle;
   a driver input unit configured to obtain an input from a driver of the vehicle during operation of the vehicle; and
   a processor coupled to the memory and the driver input unit and configured to:
      determine a driver intended braking torque for the vehicle based on the input from the driver;
      calculate a maximum regenerative braking torque for the regenerative braking system using the plurality of dynamic vehicle parameters, wherein the maximum regenerative braking torque comprises an amount of regenerative braking torque that would produce the maximum regenerative energy capture corresponding to the maximum regenerative braking torque at a particular point in time during operation of the vehicle;
      if the driver intended braking torque for the vehicle is less than the maximum regenerative braking torque for the regenerative braking system, then providing instructions to the regenerative braking system to provide regenerative braking torque for the vehicle via the regenerative braking system in an amount that is equal to the driver intended braking torque for the vehicle; and
      if the driver intended amount of braking torque for the vehicle is equal to the maximum regenerative braking torque for the regenerative braking system, then:
         provide instructions to the regenerative braking system to provide regenerative braking torque for the vehicle in an amount that is equal to the maximum regenerative braking torque for the regenerative braking system; and
         provide instructions to the friction braking system to provide friction braking torque for the vehicle in an amount that is equal to a difference between the driver intended braking torque for the vehicle and the maximum regenerative braking torque for the regenerative braking system.

13. The system of claim 12, wherein:
   the vehicle includes a wheel;
   the memory is further configured to store a wheel slip of the wheel during operation of the vehicle; and
   the processor is further configured to calculate the maximum regenerative braking torque for the regenerative braking system using the wheel slip.

14. The system of claim 13, wherein:
   the memory is further configured to store a speed of the vehicle during operation of the vehicle; and
   the processor is further configured to calculate the maximum regenerative braking torque for the regenerative braking system using the wheel slip and the speed.

15. The system of claim 14, wherein:
   the memory is further configured to store the mass of the vehicle during operation of the vehicle; and
   the processor is further configured to calculate the maximum regenerative braking torque for the regenerative braking system using the wheel slip, the speed, and the mass.

16. A system for controlling regenerative braking in a vehicle having regenerative braking units and an energy storage system, the system comprising:
   a driver input unit configured to obtain an input from a driver of the vehicle during operation of the vehicle
   a plurality of sensors configured to measure a plurality of dynamic vehicle parameters during operation of the vehicle, the plurality of dynamic vehicle parameters comprising an acceleration of the vehicle, a mass of the vehicle, a wheel radius of the vehicle and a drive radius of the vehicle; and
   a controller coupled to the sensor and configured to:
      determine a driver intended braking torque for the vehicle based on the input from the driver;
      calculate a maximum regenerative braking torque for the regenerative braking system using the plurality of dynamic vehicle parameters, the maximum regenerative braking torque corresponding to a maximum regenerative energy capture for the energy storage system, wherein the maximum regenerative braking torque comprises an amount of regenerative braking torque that would produce the maximum regenerative energy capture corresponding to the maximum regenerative braking torque at a particular point in time during operation of the vehicle;
      if the driver intended braking torque for the vehicle is less than the maximum regenerative braking torque for the regenerative braking system, then providing instructions to the regenerative braking system to provide regenerative braking torque for the vehicle via the regenerative braking system in an amount that is equal to the driver intended braking torque for the vehicle; and
      if the driver intended amount of braking torque for the vehicle is equal to the maximum regenerative braking torque for the regenerative braking system, then:
         provide instructions to the regenerative braking units to provide regenerative braking torque for the vehicle in an amount that is equal to the maximum regenerative braking torque for the regenerative braking system; and
         provide instructions to the friction braking system to provide friction braking torque for the vehicle in an amount that is equal to a difference between the driver intended braking torque for the vehicle and the maximum regenerative braking torque for the regenerative braking system.

17. The system of claim 16, wherein:
   the vehicle includes a wheel:
   the plurality of sensors includes a wheel sensor configured to measure a movement of the wheel during operation of the vehicle; and
   the controller is further coupled to the wheel sensor and configured to:
      calculate a wheel slip of the wheel using the movement; and
      calculate the maximum regenerative braking torque for the regenerative braking system using the wheel slip.

18. The system of claim 16, wherein:
   the vehicle includes a wheel:
   the plurality of sensors includes a wheel sensor configured to measure a movement of the wheel during operation of the vehicle; and the controller is further coupled to the wheel sensor and configured to:
  calculate a speed of the vehicle using the movement; and
  calculate the maximum regenerative braking torque using the speed.

19. The system of claim 16, wherein:
the plurality of sensors includes a mass sensor configured to measure a mass of the vehicle during operation of the vehicle;
wherein the controller is further coupled to the mass sensor and configured to calculate the maximum regenerative braking torque using the mass.

20. The system of claim 16, wherein:
the vehicle includes a wheel:
the plurality of sensors includes:
  a wheel sensor configured to measure a movement of the wheel during operation of the vehicle; and
  a mass sensor configured to measure a mass of the vehicle during operation of the vehicle; and
the controller is further coupled to the wheel sensor and the mass sensor and is further configured to:
  calculate a wheel slip of the vehicle using the movement;
  calculate a speed of the vehicle using the movement; and
  calculate the maximum regenerative braking torque of the regenerative braking system using the wheel slip, the speed, and the mass.

* * * * *